United States Patent [19]

Huddle

[11] Patent Number: 5,170,605
[45] Date of Patent: Dec. 15, 1992

[54] REFRIGERATOR TRAILER FLOOR CONSTRUCTION

[75] Inventor: Thomas G. Huddle, Charleston, Ill.

[73] Assignee: Trailmobile, Inc., Chicago, Ill.

[21] Appl. No.: 815,553

[22] Filed: Dec. 27, 1991

Related U.S. Application Data

[63] Continuation of Ser. No. 646,154, Jan. 25, 1991, abandoned, which is a continuation of Ser. No. 266,947, Nov. 3, 1988, abandoned.

[51] Int. Cl.$^5$ .................................................. E04G 3/00
[52] U.S. Cl. ........................................ 52/588; 52/630
[58] Field of Search ................................. 52/588, 630

[56] References Cited

U.S. PATENT DOCUMENTS

| | | | |
|---|---|---|---|
| 2,752,018 | 7/1956 | Carell | 105/422 |
| 2,786,556 | 3/1957 | Constance | 52/588 |
| 2,923,384 | 2/1960 | Black | 52/588 |
| 2,952,341 | 9/1960 | Weiler | 52/588 |
| 3,075,802 | 1/1963 | Lowe | 52/588 |
| 3,110,371 | 11/1963 | Peridder | 105/422 |
| 3,128,851 | 4/1964 | Peridder | 52/588 |
| 4,091,743 | 5/1978 | Lemon | 108/375 |
| 4,420,087 | 12/1983 | Johns | 52/588 |
| 4,631,891 | 12/1986 | Donavick | 52/732 |
| 4,809,479 | 3/1989 | Tierne | 52/588 |

Primary Examiner—Henry E. Raduazo
Attorney, Agent, or Firm—Myers & Associates, Ltd.

[57] ABSTRACT

A floor construction for refrigerated vehicles is provided with longitudinal elements having parallel upstanding walls supporting a load supporting surface and providing substantially retilinear ducts between the longitudinal elements and providing for rectilinear end sealing plates.

3 Claims, 3 Drawing Sheets

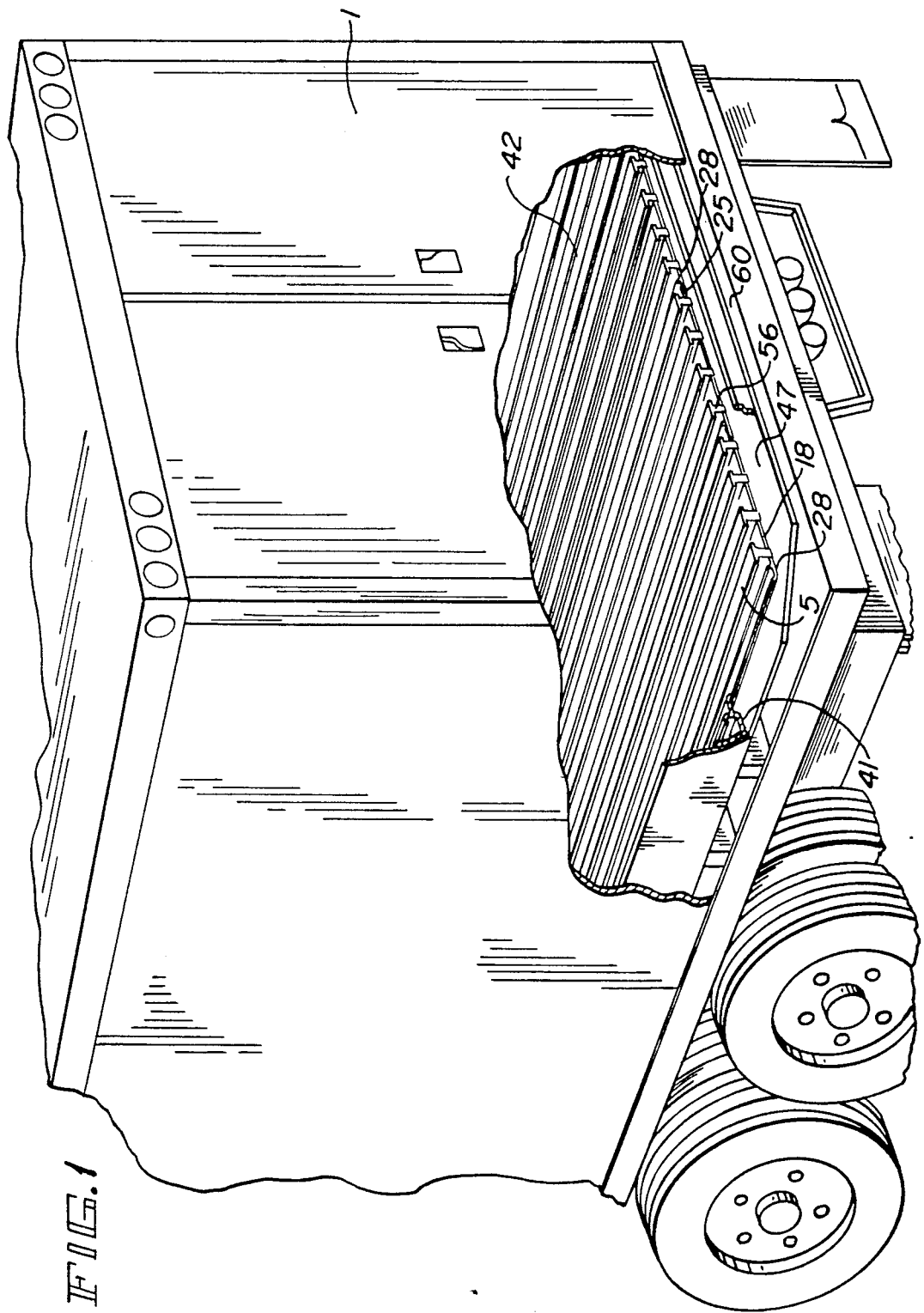

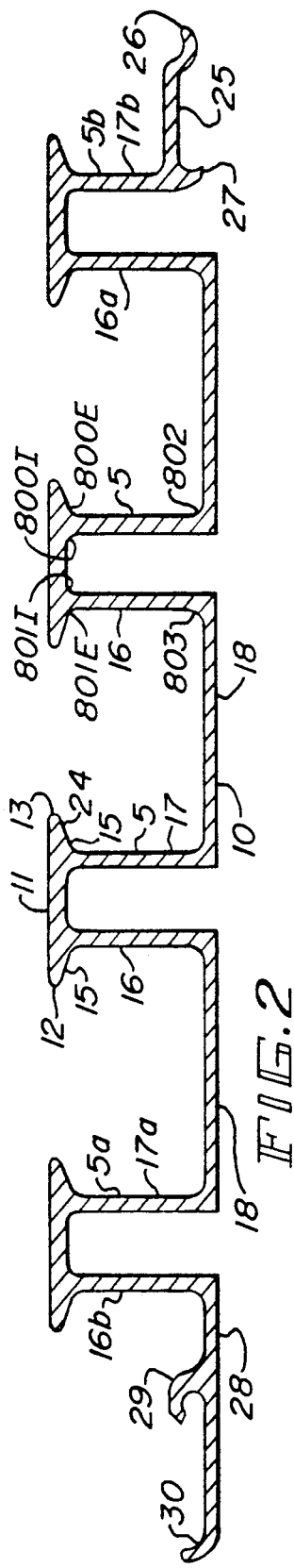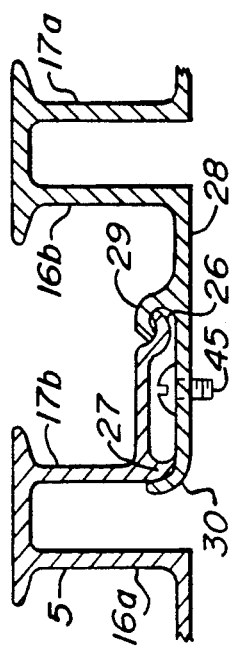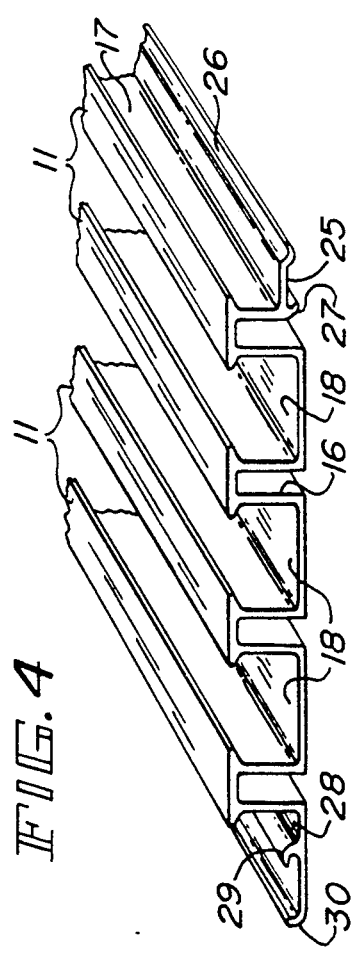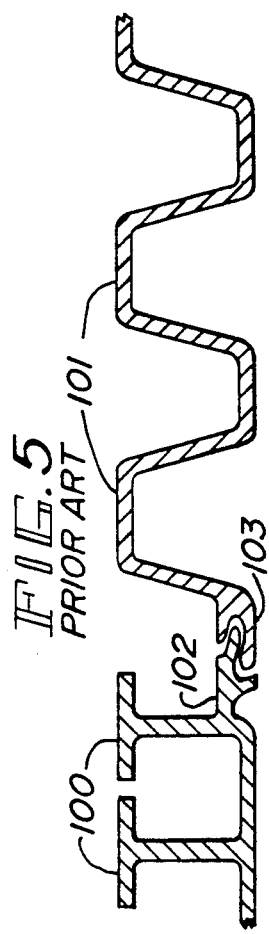

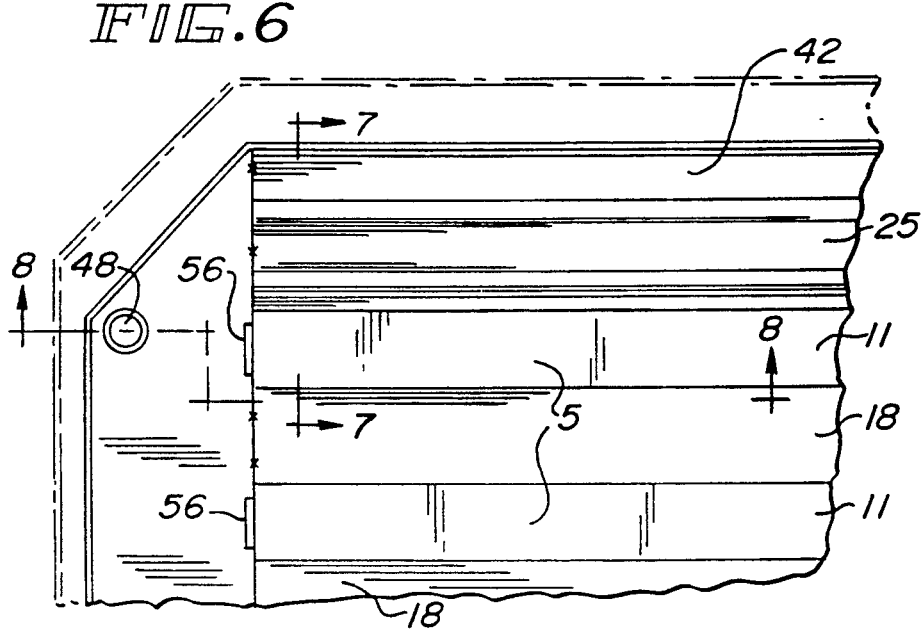
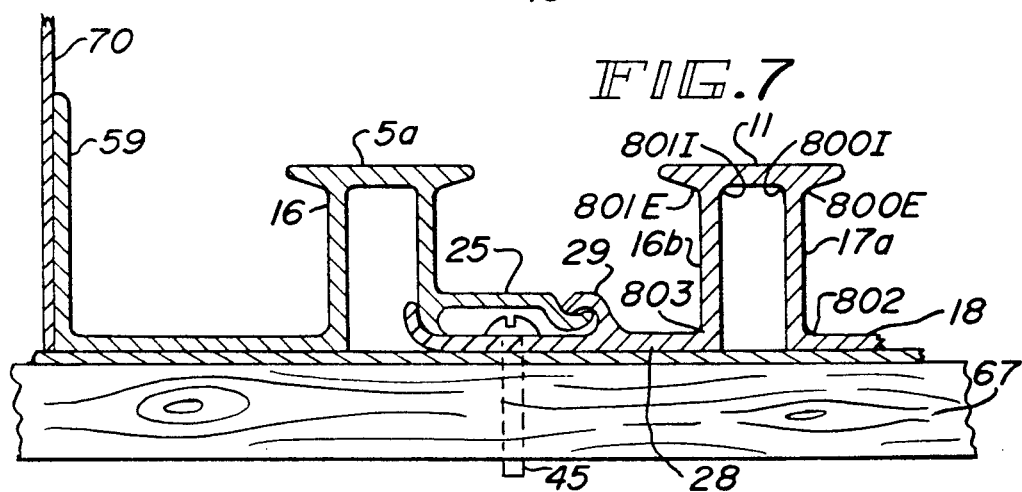
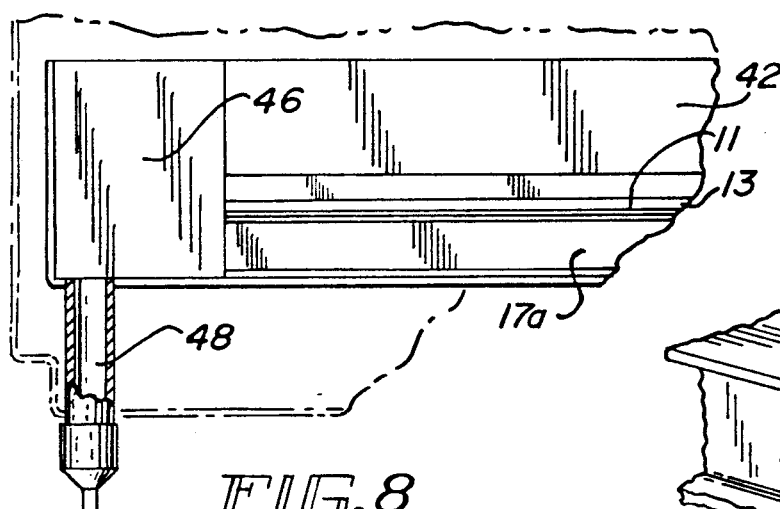
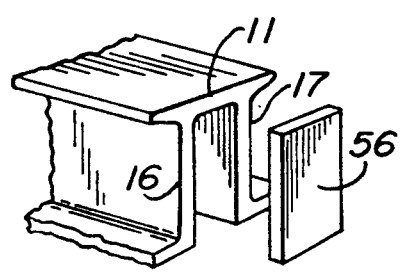

REFRIGERATOR TRAILER FLOOR CONSTRUCTION

This is a continuation of co-pending application Ser. No. 646,154 filed Jan. 25, 1991 and now abandoned which is a continuation of Ser. No. 266,947 filed Nov. 3, 1988 and now abandoned.

FIELD OF INVENTION

This invention relates to a floor construction for semitrailers, truck bodies or other cargo carrying vehicles and more specifically a construction which provides for improved air circulation and strength. This application is a continuation of my co-pending U.S. Patent Application entitled REFRIGERATOR TRAILER FLOOR CONSTRUCTION, U.S. Ser. No. 07/266,947, filed Nov. 3, 1988.

BACKGROUND OF THE INVENTION

In the case of refrigerated semi-trailers, truck bodies or other vehicles or cargo containers which are used to maintain a cargo at a desired temperature, the proper circulation of air above and below the cargo is desirable. Refrigeration in particular is used to prevent damage or deterioration of perishable goods, to transport frozen foods or the like. Alternatively in certain cargo applications it may be desirable to maintain a cargo at a temperature above ambient temperature such as to prevent a bottled liquid cargo from freezing during transport in the winter or similar applications.

To promote air circulation below the cargo, various configurations have been used to accomplish the two necessary functions of holding the cargo in a raised position relative to the floor of the trailer and to provide ducts through which conditioned air is permitted to circulate throughout the length of the trailer. In the environment in which these structures are typically used, a number of additional considerations come into play. The structures require the ability to withstand structural loads in excess of the simple weight of the cargo in that transportation may cause various bumps and shifts in the load, loading and unloading may result in dropping of the cargo and typically the cargo is loaded through the use of fork-lifts which drive into the trailer itself contributing loads from the weight of fork-lift plus the cargo distributed on the relatively small surface area in contact with the fork-lift wheels.

Various solutions to these problems have been attempted and patented including various combinations of elements. One element is typically called a "T" section because the upstanding elements form a section in a "T" shape. Another section is known as a duct section which typically uses uniform width corrugations with angled walls and flat top elements for supporting a load and flat bottom elements carried on the sub-pan of the trailer.

As has been noted in the prior art, the "T" sections provide less restriction to the longitudinal air flow but are more difficult to clean and not as strong as the duct construction. An example of the "T" construction is shown in U.S. Pat. No. 3,368,315 which focused on the interlocking edges of adjacent extruded panels. The duct configuration provides greater strength than the "T" and easier cleaning but less than half the area is available for air circulation. In the duct configuration only the area of the "U" section is open to the cargo compartment while the inverted "U" is effectively closed through its resting on the stringers comprising a portion of the sub-pan of the trailer.

Another alternative to use a combination of "T" section floor board extrusions and duct section extrusions using common interlocking edges. In areas of high load, such as the expected wheel base of fork-lift trucks, a stronger angled wall duct section floor board panel could be utilized, while in areas where lesser load was expected, such as the center of the trailer, the "T" section floor board panels could be used. Because of their interlocking nature, the combination of different section panels or "boards" could thus result in placement of a "T" panel immediately adjacent a duct panel.

U.S. Pat. No. 4,631,891 issued to Donavich provides for the placement of "T" section elements next to angled wall duct elements in the same floor board extrusion. U.S. Pat. No. 3,128,851 issued to Deridder provides another alternative whereby the width of the inverted "U" section, angled-wall corrugation has been reduced to provide a slight increase in the airflow.

SUMMARY OF THE INVENTION

In the preferred embodiment, the invention comprises a plurality of extruded aluminum panels or boards. Each panel itself comprises a plurality of longitudinally parallel ribs to be used in conjunction with interlocking panels so that substantially the full width of the floor of a semi-trailer may be covered.

An object of the invention is to provide increased area available for air circulation versus the prior art duct or combined duct-T configuration.

Another object of the invention is to provide for strength superior to that of the "T" configuration in supporting loads vertically and in dealing with horizontal forces and providing improved strength vertically when compared to the prior art duct configuration.

Another object of the invention is to provide for a single extrusion with sufficiently improved strength and air circulation properties so that it may be used across substantially the entire width of the semi-trailer without recourse to multiple configurations which may be unable to be adapted to different cargo loading requirements.

Another object of the invention is the use of a single configuration which may therefore be produced with a single die increasing the ease of manufacture and reducing cost and requirement for inventory.

Another object is to provide for a panel with interlocking edges with sufficient mass and appropriate configuration for welding to form a continuous floor.

Another object is to provide for extrusions with a geometry which more readily permits closure of the ends of the extrusion so as to minimize leakage under the panel and into the sub-pan of the semi-trailer.

Other advantages of the invention will become apparent upon further reading of the specification.

BRIEF DESCRIPTION OF THE DRAWINGS

FIG. 1 is a perspective view of the rear of a refrigerated semi-trailer with the invention floor construction installed.

FIG. 2 is a sectional view of the extrusion.

FIG. 3 is a sectional view of the interlocking edges of two panels.

FIG. 4 is a perspective view of a panel used in the floor construction.

FIG. 5 is a sectional view showing a prior art floor construction showing the interlocking of two prior art extrusions.

FIG. 6 is a plan view showing the invention in relation to the gutter and other trailer assemblies.

FIG. 7 is a sectional view showing the invention in relation to the gutter and other trailer assemblies.

FIG. 8 is a perspective view showing a single load bearing element with the end cap removed.

FIG. 9 is a perspective view showing the end of an extrusion section and an end plate.

DESCRIPTION OF THE PREFERRED EMBODIMENT

FIG. 1 is a perspective cut away view of the rear of a semitrailer (1) showing the invention. Apparent in this view are the support elements (5) interconnected in the same extrusion by base elements (18). The extrusions are joined together by raised edge or male flanges (25) and base edge or female flanges (28). The flanges (25) and (28) at the edges of the trailer engage corresponding flanges in the female edge board (42) and male edge board (41). Visible at the rear of the trailer in this cut away view is the trailer sub-pan (60) on which the extrusion rests.

At the rear of trailer the rear gutter assembly (47) is welded to the extrusions forming a unitary seamless floor. Further the space or channels formed between upstanding elements of the extrusion are capped at their ends by welded end caps (56).

FIG. 2 is a sectional view in which all the elements of the individual extruded panels are shown. The floor extrusion (10) is formed so as to have a plurality of parallel support elements (5). The top or upper end of each support element is formed with a horizontal web (11) which has tapered flanges (12, 13) along each edge. The elements (5) form a flat surface on the top and have rounded edges (24). The flanges are tapered to have an outwardly decreasing thickness having top surfaces continuous and coplanar with the top surface of the top web (11) and angled bottom surfaces or sides (15).

Each support element has two vertical walls (16, 17) which are parallel to one another, each wall having an interior and exterior surface. The walls support the top web (11) and with the flanges (12, 13) extending past the respective walls. The top surface formed by elements 11, 12 and 13 is normal to the walls. The top surface formed by elements 11, 12 and 13 is attached to the vertical walls 16 and 17 by interior and exterior force transferring fillets 800E, 800I, 801E and 801I. The fillets operate to transfer an impulse having a horizontal component applied to the top surface to tensile and compressive loadings on the vertical walls 16b and 17a, thereby eliminating first order shear loading of the vertical walls and greatly increasing the stiffness of the structure. Additionally the fillets act as shear loaded springs and are active in absorbing impulses applied parallel to the top surface by elastically deforming; this deformation also contributing to the stiffness of the structure and additional lower fillets 802 & 803 co-operative with the upper fillets 800E, 800I, 801E, 801I to further enhance the strengthening characteristics of the structure.

At least one of the vertical walls of each support element at its lower end intersects a base element or interconnecting web (18). The interior support elements (17) have their vertical side walls intersecting a base element (8). The outer support elements (5a and 5b) have their inner vertical walls (17a and 16a) intersecting and merging into a base element. Their outer walls intersect and merge into elements for interlocking the panels. At the point where the respective vertical wall intersects the base, the inner surfaces forms an angle of substantially 90 degrees with the bottom surface of the base element. This provides a channel of maximum cross-section area in contact with the stringers of the sub-pan of the semi-trailer to best distribute the downward loads carried on the vertical walls. The corner is finished in a typical manner in the metal working arts to eliminate burrs and the like. The exterior surface of the respective vertical walls merges into a curved surface or radius at their intersection with the top surface (15) of the base element.

The outer surfaces of the base and respective parallel walls of any adjacent support element define a duct area between them. The duct (21) communicates with the semi-trailer cargo compartment through a slot (22) defined by the edges of opposing flanges (13, 12). All intersections between surfaces opening to the trailer cargo compartment are smoothly radiused for improved circulation of air and to minimize concentration of stress while under load.

Each extrusion has two opposite edges. One edge has the outermost vertical wall (17b) terminating in an intersection with an edge flange (25) which extends perpendicularly outwardly relative to the extrusion at a point above the plane of the base or interconnecting web (18). The raised edge flange (25) merges into a downward and outwardly curved flange (26) terminating in a rounded edge (24). Where the raised edge flange (25) intersects the vertical wall, the vertical walls extends downward into a downwardly depending curved ridge (27).

The opposite edge of said extrusion has a base edge flange (28) extending outwardly from the outwardmost vertical wall (16b) in the same plane as the base elements or interconnecting webs (18) which rest on the sub-pan of the semi-trailer. The base edge flange terminates in a upwardly curved edge portion (30). Near the midpoint between said upwardly curved edge portion and the intersection with the vertical wall (16) an upwardly and outwardly curved flange (29) is provided forming a rounded seat.

Further shown in FIG. 1 a series of panels or boards installed shows the relative placement of the various components and the installation of the related components to comprise a complete floor unit. The load bearing floor is made up of a series of interlocking extruded panels of the type previously described. These can be made up of stock widths so as to form floors which correspond to desired with trailers which may be effected by factors such as specific materials used in trailer walls, outside dimension of a trailer, thickness of walls and installation and the specific floor construction desired.

In order to maximize the cross-sectional area for transmitting conditioned air parallel vertical walls result in a duct area larger than that which is defined by the angled walls in the prior art. This duct cross sectional area can therefore be increased while maintaining a given dimension at the top for a desired width central load bearing element (11). Since the walls of the present invention are parallel, the relative dimension between the inner surfaces of the vertical walls of each respective support element is constant in alternative configurations.

The interior dimension between the inner surfaces of the vertical walls of a support element in a first embodiment corresponds to 25 percent of the dimension between the interior wall of one support element and the nearest interior wall of the adjacent support element. In this embodiment, it has further been determined that the distance between the edges of the respective flanges (13) of a support element should be equal to the width of the slot (22). By way of example, therefore, where there is a one half (0.5) inch space between the inner surfaces of a support element, the dimension between the inner surface of one wall of one support element and the inner surface of the nearest wall of an adjacent support element would be two (2.0) inches.

Because of the need for floor boards of different widths, to permit combinations to conform with the varying interior width of trailers in the field, this embodiment may also use a decreased separation between elements while maintaining the relative dimensions of each support element. It has been determined that the separation may be decreased to the point where the interior dimension between the inner surfaces of the vertical walls of each respective support element is approximately 29 percent of the dimension between the inner surfaces of the vertical wall of one port element. By way of example, therefore, where there is a one half (0.5) inch space between the inner surfaces of a support element, the dimension between the inner surface of one wall of port element and the inner surface of the nearest wall of an adjacent support element would be one and three quarters (1.75) inches. In either of these embodiments, it has been determined that satisfactory performance may be obtained from support elements having a height from the bottom surface of a base element (18) to the top surface of the top web (11) and flange (12 and 13) unit is equal to three times the dimension between the inner surfaces of the vertical walls of that support element. By way of example, therefore, where there is a one half (0.5) inch space between the inner surfaces of a support element, the height from the bottom surface of a base element (18) to the top surface of the load support surface (11) is one and one half (1.5) inches.

Despite these determinations of preferred embodiments, other embodiments with different relative dimensions may substantially perform the same functions in substantially the same way as the invention, depending on the specific configuration, the materials used and the thickness of the extrusions.

FIG. 3 is a fragmentary sectional view showing the male edge flange (25) projecting from wall (17b) with the downwardly depending flange (27) of the male edge flange engaging the upwardly turned flange (30) of the base or female edge flange and the curved edge portion (26) of the male edge flange engaging the upwardly depending curved flange (29) of the female edge flange. The female edge flange extends from the wall (16b).

FIG. 4 is a perspective view of the end of an extrusion showing the three dimensional appearance of the elements shown in section in FIG. 2. The top webs (11) of upstanding members (16) and (17) and male (26) and female (30, 29) edge flanges are evident.

FIG. 5 shows prior art applications where two well known prior art configurations, the "T" (100) and "duct" (101) arrangements, may be used as discussed in connection with the Background of the Invention. Since an object in the use of edge flanges (102) and (103) is to permit relatively interchangeable engagement with corresponding edge flanges of other boards, the prior art permits engagement as shown in FIG. 5 which may result in the placement of a "T" (100) immediately adjacent to a duct (101). As noted in the Background of the Invention each of these separate configurations has certain advantages and disadvantages. The instant invention maximizes advantages, minimizes disadvantages and provides this in a single extrusion rather than requiring the use of alternative extrusions.

FIG. 6 is a plan view of the forward right hand corner of the interior of a semi-trailer with the invention installed. Visible are the top webs (11) and the base elements or interconnecting webs (18) between respective elements (5). At the forward end of the assembly, the area between the upstanding elements (not visible in this view) are sealed with a welded end plate (56) (see FIG. 9). A separate front gutter structure (46) is also welded to the interconnecting webs (18) and the end plate (56) to form a seamless floor. The female edge board (42) is also welded to said front gutter assembly (46). A downwardly depending pipe (48) is utilized at the respective corners to facilitate drainage. Shown in dotted lines in this view is a representation of the exterior wall of the trailer.

The front gutter assembly (46) at the corner corresponding to the corner of the trailer may be tapered or curved to correspond to the shape of the trailer itself. A rear gutter assembly meeting specifications for rear doors and rear bolster assemblies which are a function of vendors use and industry standards for specific components for trailers and loading docks.

FIG. 7 shows the side edges of the series of interlocked panels. The floor unit shows to the placement of a male edge board (41) and female edge board (42). The male and female designations correspond to the elements of the raised edge (male) flange (25) and upwardly and outwardly curved (female) flange (29), respectively, on the floor board extrusions. The interlocked panels are held in place by stringer screws (45) or other suitable fastening methods.

The edge boards in the preferred embodiment comprise extrusions which repeat a single upstanding parallel walled and flanged section (5a). The outer portion comprises an upwardly extending terminal wall (59) placed adjacent to the interior wall (70) of the cargo compartment of the semi-trailer. A gutter is formed between the upstanding terminal wall (59) and the nearest upstanding leg (16c) of double parallel walled section (5a).

The complete sealing of all joints between all components of the floor and gutter structures is important. Since the extrusions include upwardly extending walls raised above the sub-pan structure, the openings under each upstanding element, that is as defined by the interior surfaces of the walls and bottom surface of the top web (11), run the entire length of the extrusion and would permit leakage unless the extrusions are sealed at both ends. End plates (56) are provided to be welded to form a joint (57) with the extrusion.

Various alternative embodiments for end plates may be utilized including a single continuous plate in which rectangular elements are interconnected through a narrow web. Other alternatives include multiple end plates of similar configuration the width of individual panels thereby facilitating prewelding. The configuration with parallel upstanding walls provides for a great advantage in the utilization of individual end plates because the end plates comprise simple rectangular shapes which may be easily cut from plate or bar or otherwise easily fabricated. By comparison, the prior art requires various non-rectangular polygonal shapes most formed for slanted wall ducts and require top and bottom orientation before welding.

Sub-pan construction can be of any appropriate arrangement. In the preferred embodiment the sub-pan comprises longitudinal side rails and transverse beams forming a frame for a semitrailer. This frame has a first floor element formed of suitable sheet material or lumber, typically plywood. On this floor element are placed transverse stringers. It is upon the transverse stringers that the extrusions are placed. The sides of the subpan assembly may be adapted in various ways to incorporate necessary installation, structural elements, conduits or the like.

In accordance with my invention I claim;

1. A floor construction for a refrigerated vehicle body having a floor, front, rear and side walls and plurality of extrusion formed interlocking floor panels forming a continuous floor surface comprising;
    load bearing elements each having a top and bottom closely spaced mutually supporting parallel vertical walls, a flat top web with edge flanges, and a first set of force transmitting fillets connecting each said vertical wall to its associated flat top web,
    a base web lying in a flat plane and interconnecting each load bearing element at the bottoms thereof to adjacent said load bearing elements,
    said base web including a second set of force transferring fillets connecting said base web and the vertical walls of each load bearing element,
    each panel having edges with adjacent pairs of said panels being disposed side by side and forming an interlocked unit with each edge of adjacent panels functioning as a base in the interconnected condition,
    said vertical walls and said edge flanges of adjacent ones of said load bearing elements and said base web interconnecting said adjacent ones of said load bearing elements defining a rectangular duct with a longitudinal slot between the flanges,
    said vertical walls of each load bearing element being relatively closely spaced and the adjacent vertical wall of adjacent load bearing elements being relatively widely spaced for maximizing the vertical load bearing strength of the elements and maximizing the cross sectional area of the duct to provide efficient air flow,
    said edge of one of said adjacent pairs of panels having a base having a first free edge, said base extending in said plane of said base web, and an upwardly projecting flange formed at said first free edge, the edge of the other of said adjacent pairs of panels having a downwardly projecting flange extending beneath one of said vertical walls and contacting said upwardly projecting flange and further having a horizontal male flange extending from said downwardly extending flange in spaced relationship above said base, and
    said horizontal male flange having an end portion having a second free edge, a second flange extending upward from said base and interlocking with said second free edge.

2. The invention according to claim 1 and said load bearing elements having open ends,
    end plates having top, bottom and side edges with the top and bottom edges parallel to one another and at right angles to the side edges,
    the open ends of said load bearing elements sealed with said end plates.

3. The invention according to claim 1, and
    a drain gutter so attached to said floor as to provide a seamless means for draining fluids impinging on said floor.

* * * * *